United States Patent
Katoh

(10) Patent No.: US 6,999,115 B1
(45) Date of Patent: Feb. 14, 2006

(54) IMAGE TAKING APPARATUS WITH AN A/D CONVERTER AND DSP WITH VARIABLE QUANTIZATION BIT NUMBERS

(75) Inventor: Satoshi Katoh, Tokyo (JP)

(73) Assignee: NEC Corporation, (JP)

(*) Notice: Subject to any disclaimer, the term of this patent is extended or adjusted under 35 U.S.C. 154(b) by 886 days.

(21) Appl. No.: 09/707,815

(22) Filed: Nov. 7, 2000

(30) Foreign Application Priority Data

Nov. 10, 1999 (JP) ................................. 11/319606

(51) Int. Cl.
 *H04N 5/228* (2006.01)
(52) U.S. Cl. ............. 348/222; 348/333.01; 348/231.99
(58) Field of Classification Search ............. 348/222.1, 348/572, 231.99, 333.01, 207.99
See application file for complete search history.

(56) References Cited

U.S. PATENT DOCUMENTS

| | | | | |
|---|---|---|---|---|
| 4,566,074 A | * | 1/1986 | Nishikawa | 702/86 |
| 5,124,784 A | * | 6/1992 | Takahashi et al. | 348/572 |
| 5,301,026 A | * | 4/1994 | Lee | 348/584 |
| 5,404,165 A | * | 4/1995 | Ohtsubo et al. | 348/254 |
| 5,493,335 A | * | 2/1996 | Parulski et al. | 348/231.6 |
| 6,137,533 A | * | 10/2000 | Azim | 348/222.1 |
| 6,252,536 B1 | * | 6/2001 | Johnson et al. | 341/155 |
| 6,674,464 B1 | * | 1/2004 | Mizutani et al. | 348/222.1 |
| 6,686,957 B1 | * | 2/2004 | Johnson et al. | 348/222.1 |
| 2004/0056968 A1 | * | 3/2004 | Mizutani et al. | 348/231.99 |

FOREIGN PATENT DOCUMENTS

| | | |
|---|---|---|
| JP | 8-125924 | 5/1996 |
| JP | 08125924 | * 5/1996 |
| JP | 9-93470 | 4/1997 |
| JP | 09093470 | * 4/1997 |
| JP | 10-276356 | 10/1998 |
| JP | 11-136551 | 5/1999 |
| JP | 11-164178 | 6/1999 |

* cited by examiner

*Primary Examiner*—David L. Ometz
*Assistant Examiner*—Gevell Selby
(74) *Attorney, Agent, or Firm*—Hayes Soloway P.C.

(57) ABSTRACT

An image taking apparatus, which can reduce the power consumption of the total system of the image taking apparatus without deteriorating image quality when an image is displayed on a liquid crystal display (LCD), is provided. In the image taking apparatus, the quantization bit number at an analog to digital (A/D) converter and the signal processing bit number at a digital signal processor (DSP) are variable. With this, at an LCD displaying mode that video signals are displayed on the LCD, the quantization bit number at the A/D converter is reduced and also the signal processing bit number at the DSP is reduced to the same bit number at the A/D converter. With this operation, at the LCD displaying mode, the power consumption at the A/D converter and the DSP is reduced, therefore the power consumption of the total system of the image taking apparatus is largely reduced.

22 Claims, 8 Drawing Sheets

IMAGE TAKING APPARATUS WITH AN A/D CONVERTER AND DSP WITH VARIABLE QUANTIZATION BIT NUMBERS

BACKGROUND OF THE INVENTION

The present invention relates to an image taking apparatus that displays an image taken by a solid state image taking device on a display, in particular, in which the power consumption of the total system of the image taking apparatus is reduced at the time when a monitoring image is displayed on the display.

DESCRIPTION OF THE RELATED ART

Among image taking apparatuses, an electronic still camera, which displays an image taken by a solid state image taking device, such as a charge coupled device (CCD), on a displaying apparatus, such as a liquid crystal display (LCD), as a monitoring image, and also in which the image is recorded in a recording medium, such as a floppy disk or a memory card, has been rapidly and widely used in the market.

At the solid state image taking device used in the electronic still camera, a CCD having more than 2 million pixels has been used mainly instead of the CCD having about 1.3 million pixels, and an electronic still camera provided a CCD having a large number of pixels has been rapidly developed.

The reasons why the electronic still camera provided the CCD having a large number of pixels has been widely developed are explained below. First, the cost of the solid state image taking device has decreased. Secondly, the performance of central processing unit (CPU) has improved rapidly as represented in Pentium CPU, and the large number of data has been processed easily at a consumer use personal computer (PC) by that the recording medium has large capacity. In this, the Pentium is a registered trademark of Intel Corp. Also, a high definition image being more than a video graphics array (VGA) class image, used mainly in a few years ago, has been required by users.

In the near future, the electronic still camera will use a multifunction solid state image taking devices having large pixels, that used for various purposes. However, the power consumption for electronic still camera will be increased because of the larger number of pixels and the multi-function capabilities of the camera.

If the number of pixels is increased, the electrode capacity of the solid state image taking device is increased. And, the driving frequency of the solid state image taking device may also increase in proportion to the increase of the number of pixels.

As a result, the power consumption of a driving circuit for driving the solid state image taking device is increased, and the operating frequency of the total system of the electronic still camera is also increased. Therefore the power consumption of the total system of the electronic still camera is increased.

Because the electronic still camera has multi-functions in addition to the displaying apparatus and the recording medium mentioned above, a TV set and/or a PC is connected to the total system of the electronic still camera. With these additional devices connection, the power consumption of the total system of the electronic still camera will be increased. Consequently, the battery life of the camera battery is decreased, and consequently the shooting time and the number of recording images is forced to decrease. Therefore, electronic still camera has many functions, these additional functions can not be used sufficiently.

Therefore when the electronic still camera is developed, and the performance and the functions of the electronic still camera is studied, it is also very important to reduce the power consumption of the total system of the electronic still camera. At the electronic still camera, the number of times displaying images such as monitoring images on the LCD is large, and further, the power consumption of the LCD is large. Therefore, in order to reduce the power consumption of the total system, it is very effective that the power consumption of the total system is decreased at the time when the image is displayed on the LCD.

In order to solve the problem mentioned above, various technologies, in which the power consumption of the total system is decreased at the time when the image is displayed on the LCD, have been disclosed. For example, these technologies are disclosed in Japanese Patent Applications Laid-Open No. HEI 11-164178, HEI 11-136551, HEI 10-276356, and HEI 9-93470.

These conventional technologies, in which the power consumption of the total system of the electronic still camera at the time displaying the image on the LCD is reduced, are explained below.

First, the electronic still camera disclosed in the Japanese Patent Application Laid-Open No. HEL 11-164178 is explained. FIG. 1 is a block diagram showing a structure of the conventional electronic still camera disclosed in the Japanese Patent Application Laid-Open No. HEI 11-164178.

As shown in FIG. 1, the conventional electronic still camera consists of an image taking circuit 501, a signal processor 502, a compression/expansion circuit 503, an image information memory 504, a CPU 505, a compression rate setting switch 506, an amount of light controlling circuit 507, a brightness adjusting volume 508, an LCD monitor 509, and a back-light 510.

At this conventional electronic still camera, the compression rate of image data of an image to be taken at the image taking circuit 501 is set beforehand at the compression rate setting switch 506. After the compression rate is set, the image data are collected at the image taking circuit 501. In this, the compression rate of the image data corresponds to the image quality of the image, i.e., the higher the compression rate is, the worse the image quality.

The image taking circuit 501 takes image data and outputs the image data to the signal processor 502. The signal processor 502 converts the image data outputted from the image taking circuit 501 to image data for displaying on the LCD monitor 509 and outputs the converted image data.

The compression/expansion circuit 503 compresses the image data outputted from the signal processor 502 by the compression rate set at the compression rate setting switch 506. The image information memory 504 stores the image data compressed at the compression/expansion circuit 503.

The amount of light controlling circuit 507, in case that the image data stored in the image information memory 504 is reproduced and displayed on the LCD monitor 509, controls the amount of light of the back-light 510 for the LCD monitor 509 based on the compression rate of the image data stored in the image information memory 504. The brightness adjusting volume 508 adjusts the amount of light controlling circuit 507 finely.

The CPU 505 controls the signal processor 502, the compression/expansion circuit 503, the amount of light controlling circuit 507, and the brightness adjusting volume 508.

In conventional electronic still camera having the structure mentioned above, when the image data stored in the image information memory 504 is compressed by a compression rate that is lower than a normal compression rate, the amount of light controlling circuit 507 controls so that the amount of light of the back-light 510 becomes lighter than normal light. And, when the image data stored in the image information memory 504 is compressed by a compression rate that is higher than the normal compression rate, the amount of light controlling circuit 507 operates so that the amount of light of the back-light 510 becomes darker than the normal light.

In other words, in the conventional electronic still camera, when an image data whose image quality is low is displayed on the LCD monitor 509, the amount of light of the back-light 510 is controlled to be darker than the normal light. With this, the power consumption of the total system is reduced.

Next, the electronic still camera disclosed in the Japanese Patent Application Laid-Open No. HEI 11-136551 is explained. FIG. 2 is a block diagram showing a structure of the conventional electronic still camera disclosed in the Japanese Patent Application Laid-Open No. HEI 11-136551.

As shown in FIG. 2, this conventional electronic still camera consists of a camera 601, an LCD 602, a back-light 603 for the LCD 602, a controller 604 for controlling the amount of light of the back-light 603, input switches 608, 609, and 610 for setting conditions at taking or reproducing images, a sensor 607 for sensing the inputted state of the input switches 608, 609, and 610, a timer 606 that starts counting from the time when any of the input switches 608, 609, and 610 is inputted base on the sensed result of the sensor 607, a memory 605 for memorizing the amount of light of the back-light 603, a setting display panel 611 for displaying the setting conditions at the taking or reproducing images base on the inputted state of the input switches 608, 609, and 610, and a power source 612. In this, the LCD 602 is disposed in the camera 601.

In the conventional electronic still camera having the structure mentioned above, when it is judged that a photographer is operating the input switches 608, 609, and 610 base on the counted number at the timer 606, the controller 604 judges that the photographer is not watching the LCD 602 attentively, and controls so that the amount of light of the back-light 603 for the LCD 602 becomes dark.

That is, at this conventional electronic still camera, when the image is displayed on the LCD 602, in case that when the photographer is setting the conditions of taking or reproducing images, the amount of the back-light 603 is controlled to become dark. Thus, the power consumption of the total system is reduced.

Next, the electronic still camera disclosed in the Japanese Patent Application Laid-Open No. HEI 10-276356 is explained. FIG. 3 is a block diagram showing a structure of the conventional electronic still camera disclosed in the Japanese Patent Application Laid-Open No. HEI 10-276356.

As shown in FIG. 3, this conventional electronic still camera consists of an image taking section 702 which converts an optical image of a subject to be taken to image data and outputs the converted image data, a capture memory 703 which stores the image data outputted from the image taking section 702 temporarily, a displaying section 704 which provides a LCD 741 that displays the image data stored in the capture memory 703, and a controller 701 which controls the image data to be displayed on the LCD 741.

The image taking section 702 consists of a CCD 721 which converts an optical image of a subject to be taken to image data and outputs the converted image data to the capture memory 703, and a CCD controller 722 which drives the CCD 721.

The controller 701 consists of an exposure controller 711 which calculates an exposure based on the brightness of the image data stored in the capture memory 703 and sets a shutter speed to the CCD controller 722 in the image taking section 702 based on this calculated result, an LCD brightness controller 712 which sets the brightness of the LCD 741 based on the calculated result at the exposure controller 711, and an LCD display controller 713 which converts the image data stored in the capture memory 703 to image data to be displayed on the LCD 741 and outputs the converted image data to the displaying section 704.

The displaying section 704 consists of the LCD 741, and an LCD controller 742 which controls the LCD 741 based on the brightness set at the LCD brightness controller 712 and the image data outputted from the LCD display controller 713.

At this conventional electronic still camera having the structure mentioned above, the exposure is calculated at the exposure controller 711 based on the brightness of the image data stored in the capture memory 703, and the brightness of the LCD 741 is controlled by the exposure calculated at the exposure controller 711.

That is, at this conventional electronic still camera, in case that it is judged that image data, whose surroundings of a subject to be taken are dark, are displayed on the LCD 741, the brightness of the LCD 741 is controlled to make low. With this, the power consumption of the total system is reduced.

Next, a monitor controlling apparatus for an electronic still camera disclosed in the Japanese Patent Application Laid-Open No. HEI 9-93470 is explained. FIG. 4 is a block diagram showing a structure of this monitor controlling apparatus for the electronic still camera disclosed in the Japanese Patent Application Laid-Open No. HEI 9-93470.

As shown in FIG. 4, this monitor controlling apparatus for the electronic still camera consists of an electronic still camera 801, a memory card 823, a hard disk 827, a computer 824, and a TV set 833.

The electronic still camera 801 consists of a system controller 810, an optical block 811, a CCD (solid state image taking device) 812, a CCD driver 813, clock generators 814 and 837, a correlated double sampling sample hold circuit 815 (hereinafter referred to as CDS), an A/D converter 816, a pulse gate circuit 817, a frequency divider 818, an image memory 819, a video digital signal processor 821 (hereinafter referred to as DSP), an interface (I/F) circuit 822, a card connector 825, an external connector 826, a D/A converter 831, a monitor driver 832, a video out connector 834, an LCD driver 835, an LCD 836, and an operating panel 838.

At this electronic still camera 801, operation is executed by either one of two modes, that is, a monitor through mode in which pixel signals obtained through the CCD 812 are displayed on the LCD 836 as a moving image, and a recording mode in which the pixel signals obtained through the CCD 812 are recorded in a recording medium such as the memory card 823 as a still image.

The system controller 810 is a micro computer and controls the total operation of the electronic still camera 801.

The optical block 811 is a lens to take an image, and at the CCD 812, photo diodes (not shown) are formed on its light receiving surface, and further color filters (not shown) are disposed on the photo diodes. Light passed through the optical block 811 enters the light receiving surface of the CCD 812, and pixel signals corresponding to the subject to be taken are generated on the photo diodes formed on the light receiving surface of the CCD 812.

The CCD 812 outputs the pixel signals generated on the photo diodes to the CDS 815.

The CCD driver 813 drives the CCD 812 synchronized with a clock signal outputting from the clock generator 814 in a designated cycle. That is, the CCD 812 outputs the pixel signals to the CDS 815 synchronized with the clock signal outputted from the clock generator 814.

The pulse gate circuit 817 outputs a sample hold (S/H) pulse signal to the CDS 815 based on the pulse signal outputted from the clock generator 814. The CDS 815, based on the pulse signal outputted from the pulse gate circuit 817, executes signal processes such as a process to remove noise from the pixel signals outputted from the CCD 812, and outputs the pixel signals, in which the signal process was executed, to the A/D converter 816.

The frequency divider 818, based on the pulse signal outputted from the clock generator 814, outputs an A/D clock signal to the A/D converter 816. The A/D converter 816, based on the A/D clock signal outputted from the frequency divider 818, applies A/D conversion to the pixel signals outputted from the CDS 815.

At the monitor controlling apparatus for the electronic still camera, the operation of the CDS 815, the A/D converter 816, the pulse gate circuit 817, and the frequency divider 818 is different in the monitor through mode and the recording mode. In other words, at the A/D converter 816, the cycle of the A/D conversion is different in the monitor through mode and the recording mode.

Therefore, the A/D converter 816 applies the A/D conversion to the total pixel signals outputted from the CCD 812 at the recording mode, and applies the A/D conversion to about a half of the total pixel signals outputted from the CCD 812 at the monitor through mode.

The image memory 819 stores the pixel signals applied the A/D conversion at the A/D converter 816. The DSP 821 executes color processes such as complementary color/primary color conversion, a white balance process, a gamma correction to the pixel signals stored in the image memory 819 based on a DSP clock signal outputted from the frequency divider 818. And with these processes mentioned above, the DSP 821 generates primary color signals and outputs the generated primary color signals to the I/F circuit 822. The I/F circuit 822 converts the primary color signals outputted from the DSP 821 to a format with which the primary color signals are recorded in memory card 823 or a format with which the primary color signals are recorded on the hard disk 827 connected to the computer 824.

The memory card 823 is detachable at the card connector 825. And also the computer 824 is detachable at the external connector 826.

The DIA converter 831 converts the primary color signals outputted from the DSP 821 to analog signals. The monitor driver 832 converts the primary color signals converted to the analog signals at the DIA converter 831 to, for example, signals of the NTSC system, and outputs this converted signals to the TV set 833 through the video out connector 834. The LCD diver 835, based on a clock signal outputted from the clock generator 837, applies a process to make primary color signals outputted from the DSP 981 display on the LCD 836. The LCD 836 displays the pixel signals outputted from the CCD 812 in real time as the moving image in the monitor through mode.

In this, the LCD diver 835 operates based on a clock signal outputted from the clock generator 837 in a designated cycle.

At the operating panel 838, a change-over switch for selecting either one of the monitor through mode and the recording mode is provided.

At the monitor controlling apparatus of the electronic still camera having the structure mentioned above, the cycle for executing the A/D conversion at the A/D converter 816 is different between the monitor through mode and the recording mode. And, a at the monitor through mode, the A/D converter 816 applies the A/D conversion to about only a half of the total pixel signals outputted from the CCD 812.

That is, at this monitor controlling apparatus of the electronic still camera, when the pixel signals are displayed on the LCD 836, about the half of the total pixel signals are thinned out in the monitoring through mode, and about the half of the total pixel signals are displayed on the LCD 836. With this, the power consumption of the total system is reduced.

At the electronic still camera, high definition image quality is required for image recording on a recording medium or for an image processed at a personal computer. On the other hand, it is not required that an image displayed on an LCD be a high definition image quality, generally, it is sufficient that the image has about 200000 pixels.

However, at the conventional electronic still cameras shown in FIGS. 1, 2, and 3, the process to display an image on the LCD is the same as the process making the image record on the recording medium and the process to process the image in the personal computer. Therefore, the power consumption when making the image display on the LCD becomes large.

For example, at an electronic still camera mounted a CCD having about mega-pixels as a solid state image taking device being high definition, an image processing is executed by a high bit number being about 10 bits for the image to be displayed on the LCD.

Especially, at an electronic still camera used an A/D converter whose quantization bit number is large, the image processing bit number at the DSP disposed at the back stage of the A/D converter becomes large. With this, the size of the circuit becomes large and the power consumption is increased.

At the monitor controlling apparatus of the electronic still camera shown in FIG. 4, at the monitor through mode that the image is displayed on the LCD 836, about the half of the total pixel signals outputted from the CCD 812 are thinned out. Therefore, the number of pixels of the image to be displayed on the LCD 836 is thinned out from the number of pixels of the image required a high definition image quality at the structure.

However, at the monitor controlling apparatus of the electronic still camera shown in FIG. 4, once thinned out about the half of the total pixel signals outputted from the CCD 812 remain. And, at the DSP 821, color processing is applied to about the half of the total pixel signals. Consequently, many alias color signals are generated in the image to be displayed on the LCD 836, and there is a problem that the image quality is deteriorated remarkably.

At the DSP 821, generally, the color processing is executed by using plural pixel signals. Therefore, in where the color processing is executed by using a part of the pixel signals outputted from the CCD 812, and when each of the pixel signals is made to correspond to a subject image to be taken, each of the pixel signals is positioned at the different position on the subject to be taken. Consequently, the correlation among the pixel signals used for the color processing becomes small, and many alias color signals are generated in the image to be displayed on the LCD 836.

SUMMARY OF THE INVENTION

It is therefore an object of the present invention to provide an image taking apparatus that can reduce the power consumption of the total system without deteriorating image quality when an image is displayed on an LCD.

According to a first aspect of the present invention for achieving the object mentioned above, there is provided an image taking apparatus. The image taking apparatus provides a solid state image taking device which converts an optical image of a subject to be taken to analog video signals and outputs the analog video signals, an analog to digital (A/D) converter which converts at a designated quantization bit number the analog video signals outputted from the solid state image taking device to digital video signals having the designated quantization bit number, a digital signal processor (DSP) which applies an image process to the digital video signals outputted from the A/D converter at a designated signal processing bit number, a displaying apparatus which displays the digital video signals outputted from the DSP, and a recording medium which stores the digital video signals outputted from the DSP. And the designated quantization bit number at the A/D converter is variable.

According to a second aspect of the present invention, in the first aspect, the A/D converter makes the quantization bit number in case that the digital video signals are displayed on the displaying apparatus smaller than the quantization bit number in case that the digital video signals are stored in the recording medium.

According to a third aspect of the present invention, the image taking apparatus further provides an interface (I/F) circuit which transfers the digital video signals outputted from the DSP to the recording medium in which the digital video signals are recorded, or transfers the digital video signals outputted from the DSP to an external apparatus. And the A/D converter makes the quantization bit number in case that the digital video signals are displayed on the displaying apparatus smaller than the quantization bit number in case that the digital video signals are transferred to the external apparatus through the I/F circuit.

According to a fourth aspect of the present invention, in the first aspect, the signal processing bit number at the DSP is variable, and the signal processing bit number is made to be the same bit number of the quantization bit number at the A/D converter in case that the digital video signals are displayed on the displaying apparatus. According to a fifth aspect of the present invention, in the first aspect, the image taking apparatus further provides a mode setting switch for setting an operation mode at the image taking apparatus, and a system controller which generates a bit number converting signal for setting the quantization bit number at the A/D converter and the signal processing bit number at the DSP based on the operation mode set at the mode setting switch, and outputs the bit number converting signal to the A/D converter and the DSP. And the A/D converter sets the quantization bit number based on the bit number converting signal outputted from the system controller, and the DSP sets the signal processing bit number based on the bit number converting signal outputted from the system controller.

According to a sixth aspect of the present invention, there is provided an image taking apparatus. The image taking apparatus provides a solid state image taking device which converts an optical image of a subject to be taken to analog video signals and outputs the analog video signals, an analog to digital (A/D) converter which converts at a designated quantization bit number the analog video signals outputted from the solid state image taking device to digital video signals having the designated quantization bit number, a digital signal processor (DSP) which applies an image process to the digital video signals outputted from the A/D converter at a designated signal processing bit number, a displaying apparatus which displays the digital video signals outputted from the DSP, and a recording medium which stores the digital video signals outputted from the DSP. And the A/D converter provides plural A/D converting sections in which the quantization bit number of each of the plural A/D converting sections is different between them and is fixed, and either one of the plural A/D converting sections converts the analog video signals outputted from the solid state image taking device to digital video signals, and outputs the digital video signals to the DSP.

According to a seventh aspect of the present invention, in the sixth aspect, the image taking apparatus further provides a switching circuit which selects one of the plural A/D converting sections that has smaller quantization bit number than the other of the plural A/D converting sections which is selected at the time when the digital video signals are stored in the recording medium, in case that the digital video signals are displayed on the displaying apparatus. And the digital video signals outputted from the A/D converting section selected by the switching circuit are inputted to the DSP.

According to an eighth aspect of the present invention, in the sixth aspect, the image taking apparatus further provides an interface (I/F) circuit which transfers the digital video signals outputted from the DSP to the recording medium in which the digital video signals are recorded, or transfers the digital video signals outputted from the DSP to an external apparatus. And the switching circuit, in case that the digital video signals are displayed on the displaying apparatus, selects one of the plural A/D converting sections whose quantization bit number is smaller than the other A/D converting section that is selected at the time when the digital video signals are transferred to an external apparatus through the I/F circuit.

According to ninth aspect of the present invention, in the sixth aspect, the signal processing bit number at the DSP is variable, and the signal processing bit number in case that the digital video signals are displayed on the displaying apparatus is made to be the same bit number of the quantization bit number at the A/D converting section selected by the switching circuit.

According to tenth aspect of the present invention, in the sixth aspect, the image taking apparatus further provides a mode setting switch for setting an operation mode at the image taking apparatus, and a system controller which generates an A/D converting section changing signal for switching the switching circuit based on the operation mode set by the mode setting switch and outputs the generated A/D converting section changing signal to the switching circuit, and also generates a bit number converting signal for setting the signal processing bit number at the DSP based on the operation mode set at the mode setting switch, and outputs the bit number converting signal to the DSP. And the switching circuit selects either one of the plural A/D converting sections based on the A/D converting section changing signal outputted from the system controller, and the DSP sets the signal processing bit number based on the bit number converting signal outputted from the system controller.

According to an eleventh aspect of the present invention, the system controller, in case that the digital video signals stored in the recording medium are displayed on the displaying apparatus, stops operation of the solid state image taking device, the A/D converter, and the DSP.

According to a twelfth aspect of the present invention, the mode setting switch, in case that the digital video signals have been stored in the recording medium, selects whether the digital video signals stored in the recording medium are made to display on the displaying apparatus or not.

According to a thirteenth aspect of the present invention, the image taking apparatus further provides a displaying apparatus driver for making the digital video signals display on the displaying apparatus by thinning out a part of the digital video signals outputted from the DSP.

According to a fourteenth aspect of the present invention, the image taking apparatus is an electronic still camera.

According to the present invention, the quantization bit number at the A/D converter is variable. Therefore, in case that a monitoring image is displayed on the displaying apparatus, when the quantization bit number at the A/D converter is controlled to be smaller than that at the time when the digital video signals are stored in the recording medium or are transferred to the external apparatus, the power consumption at the A/D converter can be reduced.

According to the present invention, in case that the signal processing bit number at the DSP is variable, when the monitoring image is displayed on the displaying apparatus, by setting the signal processing bit number at the DSP to equal to the quantization bit number at the A/D converter, the power consumption at the DSP can be reduced. And at the back stage of the A/D converter, plural DSPs corresponding to the quantization bit number that changes at the A/D converter are not needed to provide. With this, the circuit size of the total system of the image taking apparatus can be prevented to become large.

According to the present invention, in case that the monitoring image is displayed on the displaying apparatus, the power consumption at the A/D converter and the DSP can be reduced, and also the circuit size of the total system of the image taking apparatus can be prevented to become large. Therefore, the power consumption of the total system of the image taking apparatus can be reduced largely.

According to the present invention, in case that the monitoring image is displayed on the displaying apparatus, after that image processes are applied to the video signals outputted from the solid state image taking device at the DSP, a thinning out image process, in which a part of the video signals is thinned out at a driver for the displaying apparatus, is applied to the video signals. Therefore, the generation of color alias signals can be restrained and the deterioration of the image quality can be restrained.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
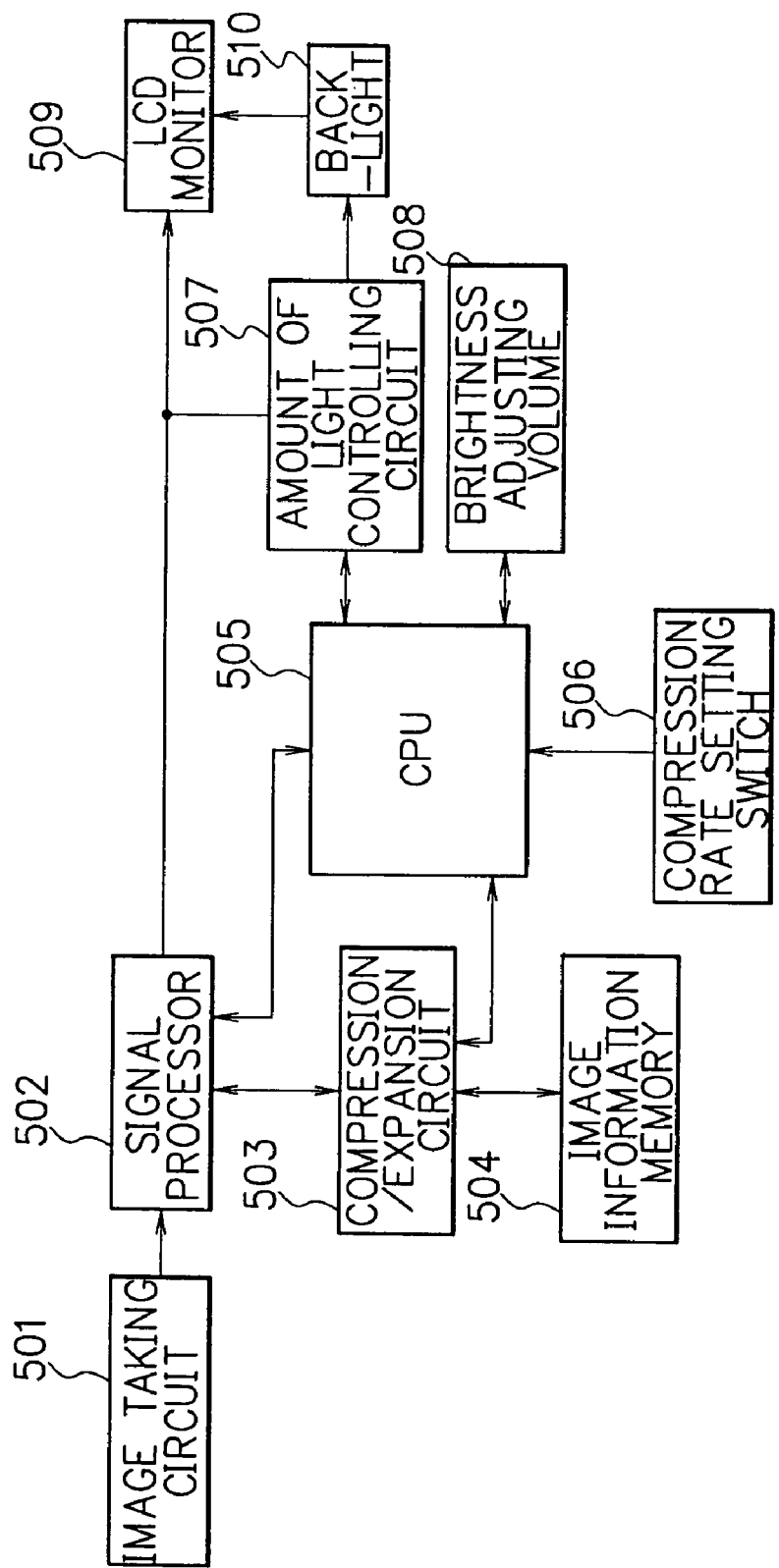
FIG. 1 is a block diagram showing a structure of a conventional electronic still camera disclosed in Japanese Patent Application LaidOpen No. HEI 11-164 178.
Figure 2:
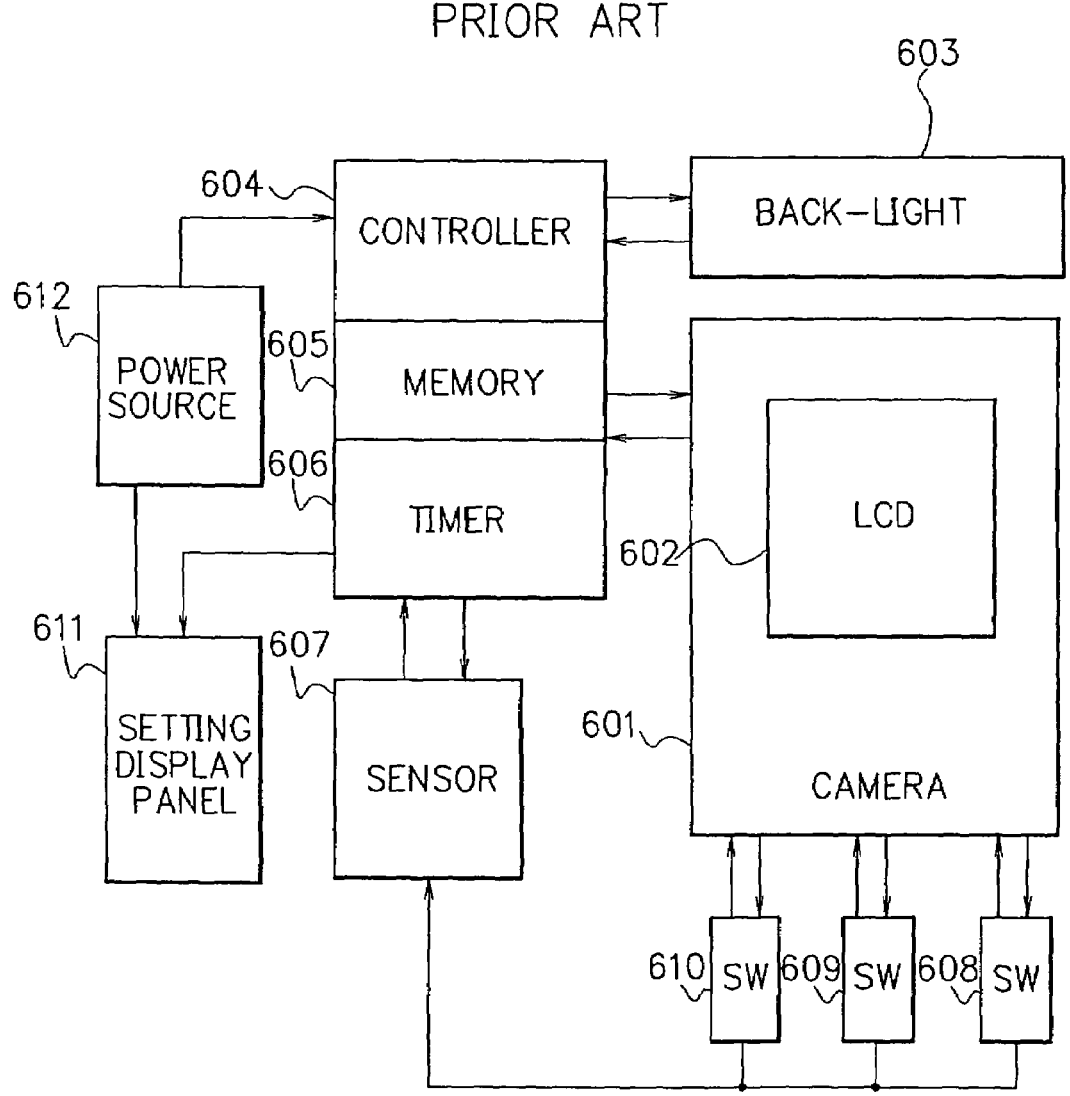
FIG. 2 is a block diagram showing a structure of a conventional electronic still camera disclosed in Japanese Patent Application LaidOpen No. HEI 11-136551.
Figure 3:
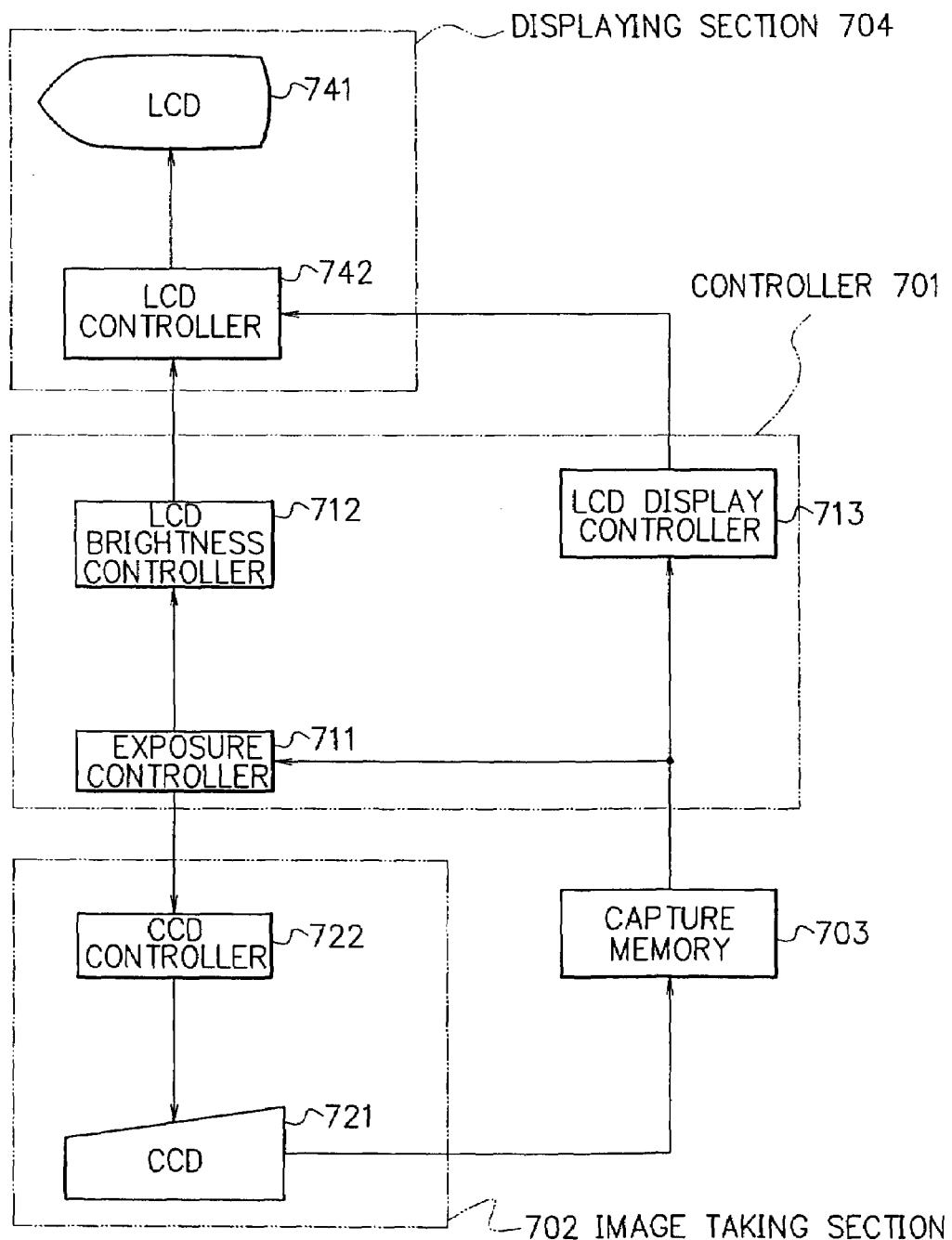
FIG. 3 is a block diagram showing a structure of a conventional electronic still camera disclosed in Japanese Patent Application Laid-Open No. HEI 10-276356.
Figure 4:
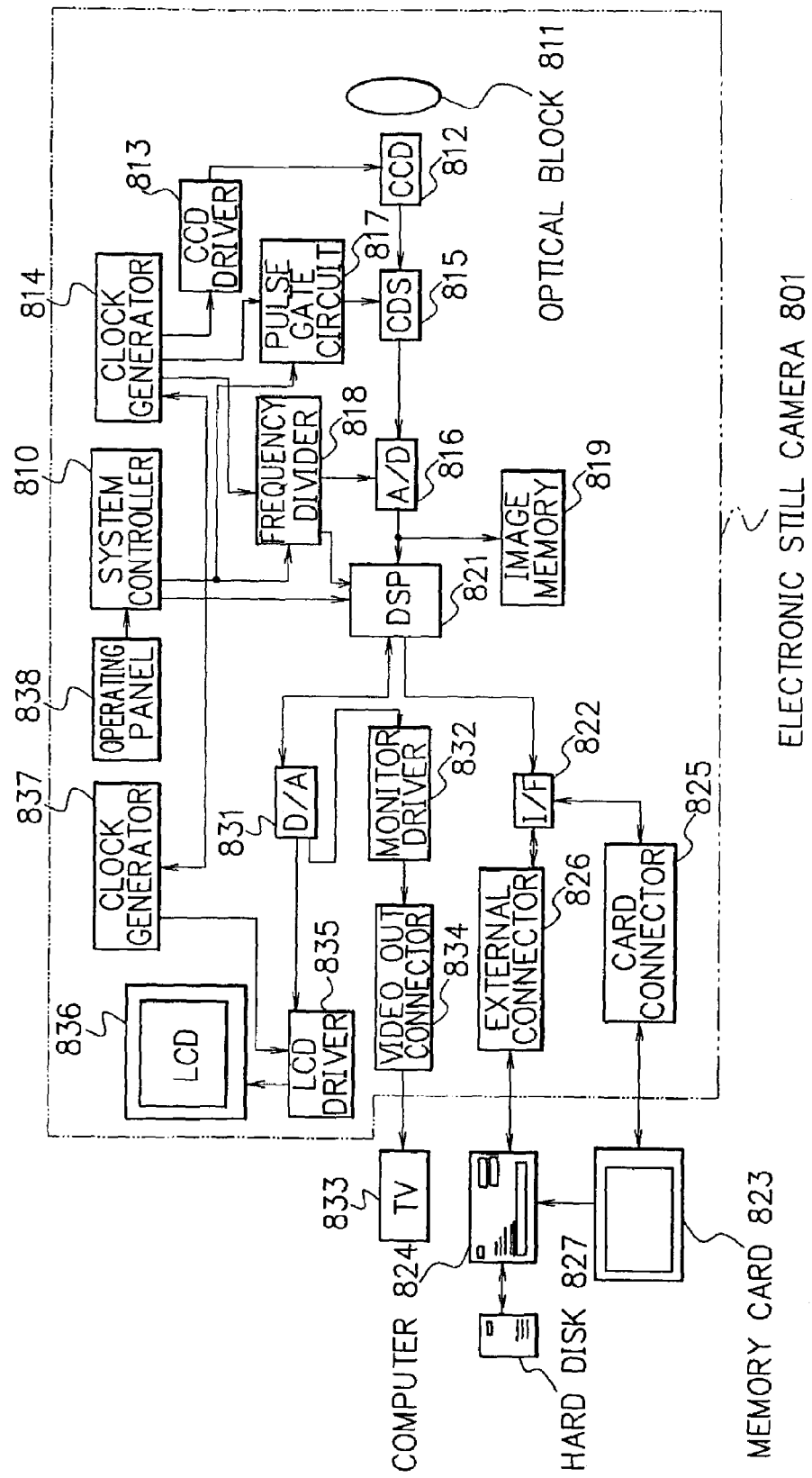
FIG. 4 is a block diagram showing a structure of a monitor controlling apparatus for an electronic still camera disclosed in Japanese Patent Application Laid-Open No. HEI 9-93470.
Figure 5:
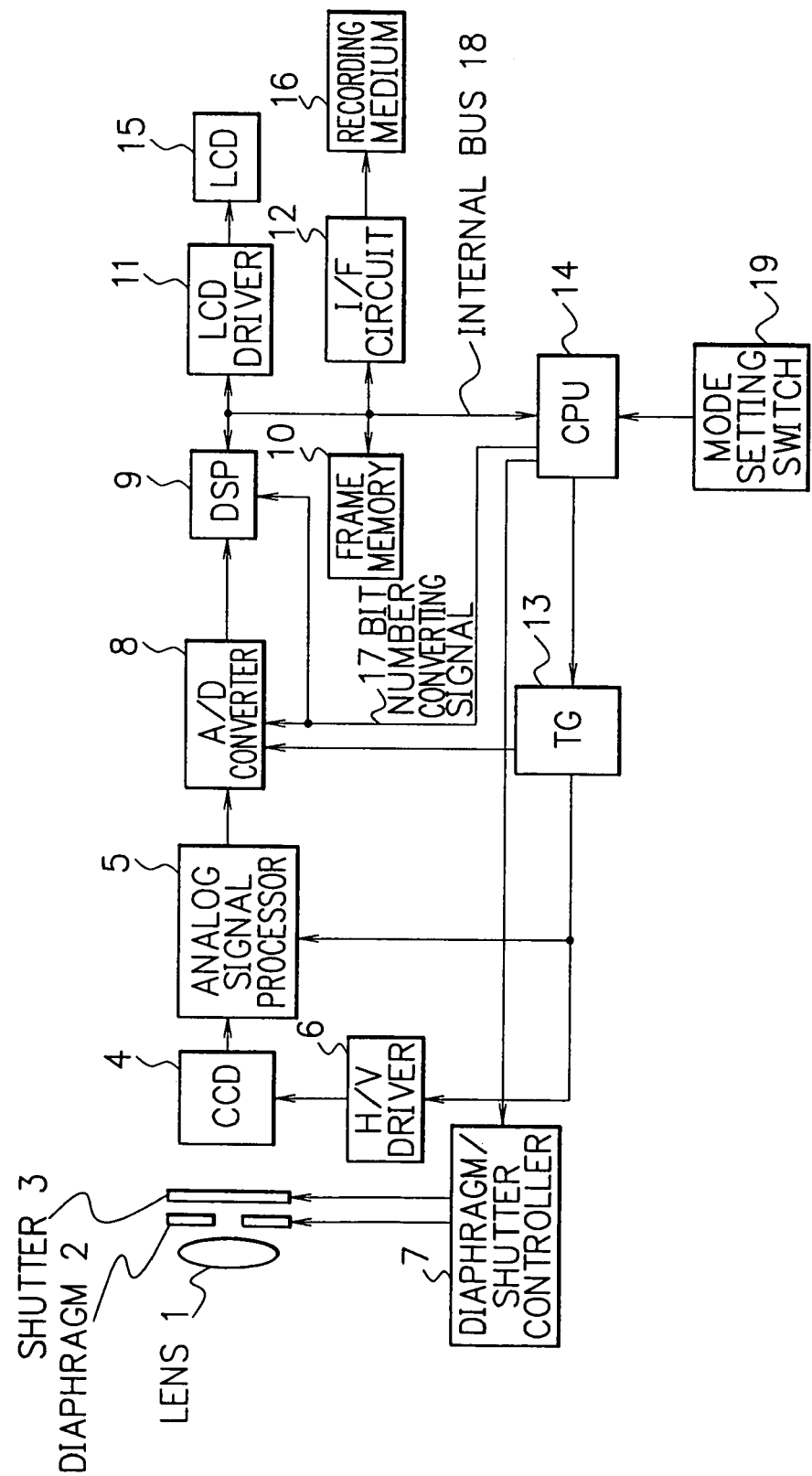
FIG. 5 is a block diagram showing a structure of a first embodiment of an image taking apparatus of the present invention.

Referring now to the drawings, embodiments of the present invention are explained in detail. FIG. 5 is a block diagram showing a structure of a first embodiment of an image taking apparatus of the present invention.

As shown in FIG. 5, the first embodiment of the image taking apparatus of the present invention consists of a lens 1, a diaphragm 2, a shutter 3, a solid state image taking device (CCD) 4, an analog signal processor 5, a horizontal/vertical (H/V) driver 6, a diaphragm/shutter controller 7, an A/D converter 8, a digital signal processor (DSP) 9, a frame memory 10, an LCD driver 11, an interface (I/F) circuit 12, a timing generator (TG) 13, a system controller (hereinafter referred to as CPU) 14, an LCD 15, a recording medium 16, a mode setting switch 19.

In the first embodiment of the present invention, any one of a taking image mode, a reproducing mode, and a personal computer (PC) displaying mode is selected at the mode setting switch 19.

In this, the taking image mode is, generally, an LCD displaying mode in which video signals taken at the solid state image taking device 4 are displayed on the LCD 15 in a monitoring image. When the shutter 3 is pushed at the LCD displaying mode, the taking image mode becomes a recording mode in which video signals taken at the solid state image taking device 4 are recorded in the recording medium 16.

The reproducing mode signifies that the video signals recorded in the recording medium 16 are reproduced and displayed on the LCD 15, and the PC displaying mode signifies that the video signals taken at the solid state image taking device 4 are transferred to a PC (not shown).

The CPU 14, based on the selected mode at the mode setting switch 19 and an operated result of the video signals at the DSP 9, controls all functions in the image taking apparatus. For example, the CPU 14 sets a quantization bit number at the A/D converter 8, and calculates various kinds of parameters at the DSP 9 and sets a signal processing bit number for changing of signal processing of the video signals at the DSP 9, and controls the TG 13 and the diaphragm/shutter controller 7 so that an optimum image taking condition can be obtained.

The TG 13 outputs a clock signal in a designated cycle to the H/V driver 6, the analog signal processor 5, and the A/D converter 8, based on an instruction from the CPU 14.

The diaphragm/shutter controller 7 controls the diaphragm 2 and the shutter 3 based on an instruction from the CPU 14, and makes an optical image of a subject to be taken obtained at the lens 1 project to the solid state image taking device 4 by adjusting the distance to the optical image of the subject to be taken and the amount of light of the optical image of the subject to be taken to desired values.

The H/V driver 6 outputs a driving pulse to the solid state image taking device 4 synchronized with the clock signal outputted from the TG 13 in a designated cycle.

The solid state image taking device 4 is a CCD in which a color filter array (not shown) is disposed in a designated arrangement on photoelectric conversion elements (not shown) arranged in two dimensions. When an optical image of a subject to be taken is projected on the photoelectric conversion elements, this optical image of the subject to be taken is converted to video signals being electric analog signals, for example, corresponding to each color of red (R), green (G), and blue (B).

And the solid state image taking device 4 provides horizontal/vertical registers (not shown) which output the video signals that the optical image of the subject to be taken was converted by the photoelectric conversion elements, based on the driving pulse outputted from the H/V driver 6. With this, the solid state image taking device 4 outputs the video signals synchronized with the clock signal outputted from the TG 13. The analog signal processor 5 removes noise, e.g. reset noise and shot noise, caused by dark current, which are included in the video signals outputted from the solid state image taking device 4 by synchronizing with the clock signal outputted from the TG 13, and outputs the video signals in which the noise is removed.

The A/D converter 8 converts the video signals outputted from the analog signal processor 5 to digital video signals by a designated quantization bit number synchronized with the clock signal outputted from the TG 13, and outputs the digital video signals to the DSP 9. In this, the quantization bit number is variable at the A/D converter 8, and the quantization bit number is changed by a bit number converting signal 17 outputted from the CPU 14.

In the first embodiment of the present invention, the solid state image taking device 4, the analog signal processor 5, and the A/D converter 8 are operated synchronized with the clock signal outputted from the TG 13. With this, all the video signals outputted from the solid state image taking device 4 are converted to the digital video signals at the A/D converter 8 by the designated quantization bit number.

Figure 6:
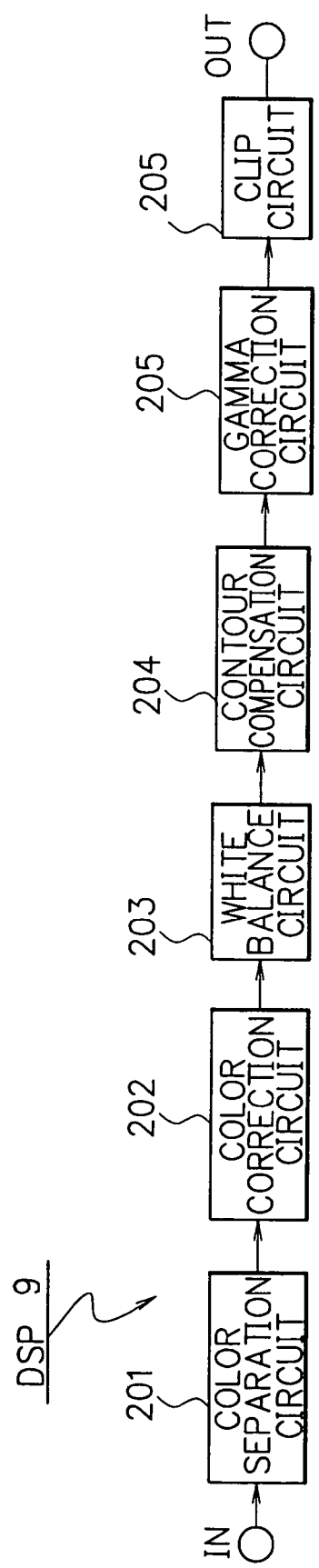
FIG. 6 is a diagram showing a structure of a digital signal processor of the first embodiment of the image taking apparatus of the present invention.

FIG. 6 is a diagram showing a structure of the DSP 9 of the first embodiment of the image taking apparatus of the present invention. As shown in FIG. 6, the DSP 9 consists of a color separation circuit 201, a color correction circuit 202, a white balance circuit 203, a contour compensation circuit 204, a gamma correction circuit 205, and a clip circuit 206.

The color separation circuit 201 applies a color interpolation process (color process) to the digital video signals outputted from the A/D converter 8 and converts the video signals outputted from the A/D converter 8 to color video signals and outputs the color video signals. For example, when video signals corresponding to R, G, and B are outputted from the solid state image taking device 4, at the color separation circuit 201, the video signals outputted from the A/D converter 8 are converted to color video signals composed of a R signal, a G signal, and a B signal.

The color correction circuit 202 applies a linear matrix process to the color video signals outputted from the color separation circuit 201 in order to improve the color reproducibility. And the white balance circuit 203 adjusts a gain of the color video signals applied the linear matrix process at the color correction circuit 202 so that a designated color reproducibility can be always kept regardless of the lightning condition at the image taking.

The contour compensation circuit 204 compensates contours of the color video signals whose gain were adjusted at the white balance circuit 203 in order to improve the sharpness of the image. And the gamma correction circuit 205 applies a non-linear process to the color video signals whose contours were compensated at the contour compensation circuit 204 in order to meet input and output characteristics of the LCD 15.

The clip circuit 206 removes color video signals that did not reach a designated gradation level from the color video signals applied the non-linear process at the gamma correction circuit 205.

The DSP 9 applies the various image processes mentioned above by the designated signal processing bit number to the color video signals outputted from the A/D converter 8 and outputs color video signals generated at the image processes mentioned above. In this, the signal processing bit number at the DSP 9 changes based on the bit number converting signal 17 supplied from the CPU 14, and is set to be the same bit number that the quantization bit number at the A/D converter 8.

In the first embodiment of the present invention, the bit number converting signal 17 outputted from the CPU 14 is directly inputted to the A/D converter 8 and the DSP 9. However, the bit number converting signal 17 outputted from the CPU 14 can be inputted to the A/D converter 8 and the DSP 9 through an internal bus 18.

The color video signals outputted from the DSP 9 are inputted to the LCD driver 11, the I/F circuit 12, the frame memory 10, and the CPU 14 through the internal bus 18.

The frame memory 10 stores the color video signals outputted from the DSP 9 temporarily and outputs the color video signals to the LCD driver 11, the I/F circuit 12, and the CPU 14 corresponding to the necessity.

The LCD driver 11 applies a process, in which these color video signals are made to display on the LCD 15, to the color video signals outputted from the DSP 9 and makes the color video signals applied the process display on the LCD 15.

Generally, the number of pixels of the video signals outputted from the solid state image taking device 4 is larger than the number of pixels required to display on the LCD 15. Therefore, the processes at the LCD diver 11 include a process to thin out a part of data of the color video signals outputted from the DSP 9.

In the Japanese Patent Application Laid-Open No. HEI 9-93470, the color interpolation process is applied to video signals thinned out from the video signals outputted from the solid state image taking device 4. Therefore the color alias signals are generated largely, as a result, the image quality is deteriorated remarkably.

However, at the first embodiment of the present invention, the color interpolation process is executed at the color separation circuit 201 provided in the DSP 9 for all the video signals outputted from the solid state image taking device 4. After this, the thinning out process of the color video signals is executed at the LCD driver 11. Therefore, the generation of the color alias signals can be restrained and the deterioration of the image quality can be prevented.

The I/F circuit 12 is an interface circuit executing a process that makes the color video signals outputted from the DSP 9 record in the recording medium 16, e.g. a memory card, a hard disk, or a magnetic tape.

In the first embodiment of the present invention, the I/F circuit 12 can be used as not only an interface circuit to record the color video signals in the recording medium 16 but also as an external bus interface circuit connecting to a PC and a printer, for example, as an IEEE 1394, a universal serial bus (USB), and a small computer system interface (SCSI).

Figure 7:
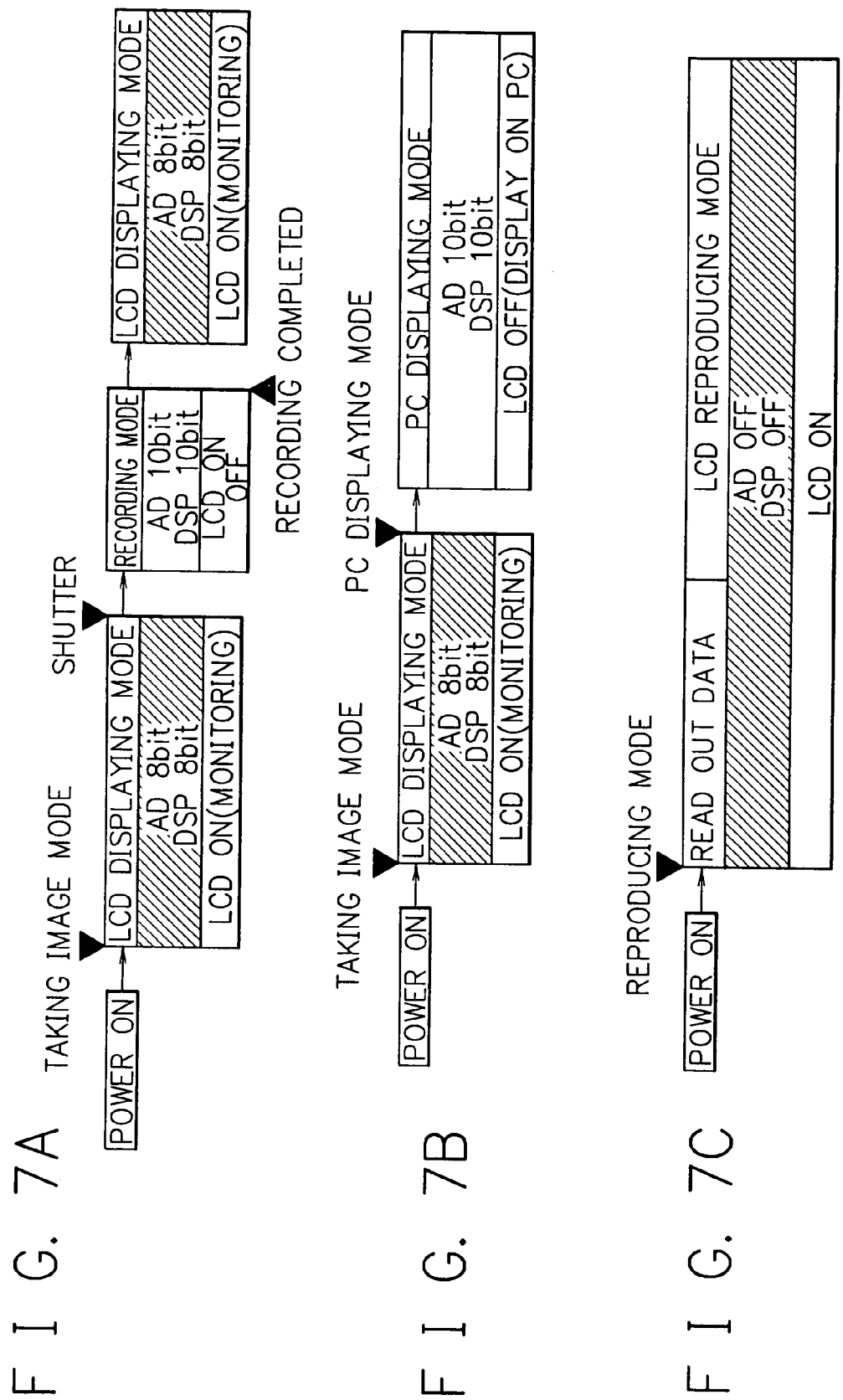
FIG. 7A is a diagram showing an operation sequence at a taking image mode of the first embodiment of the image taking apparatus of the present invention.
FIG. 7B is a diagram showing an operation sequence at a PC displaying mode of the first embodiment of the image taking apparatus of the present invention.
FIG. 7C is a diagram showing an operation sequence at a reproducing mode of the first embodiment of the image taking apparatus of the present invention.

Next, referring to drawings, operation of the first embodiment of the image taking apparatus of the present invention is explained. FIG. 7A is a diagram showing an operation sequence at the taking image mode of the first embodiment of the image taking apparatus of the present invention. FIG. 7B is a diagram showing an operation sequence at the PC displaying mode of the first embodiment of the image taking apparatus of the present invention. FIG. 7C is a diagram showing an operation sequence at the reproducing mode of the first embodiment of the image taking apparatus of the present invention.

First, the operation sequence at the taking image mode shown in FIG. 7A is explained. After the power (not shown) is turned on, and the taking image mode is selected operation of a LCD displaying mode displaying a monitoring image on the LCD 15 is executed so that a photographer can monitor a subject.

In this, even after the taking image mode is selected at the mode setting switch 19, when the power is turned on, at the functions in the image taking apparatus, the operation of the LCD displaying mode displaying the monitoring image on the LCD 15 is executed.

When the taking image mode is selected at the mode setting switch 19, the CPU 14 outputs the bit number converting signal 17, with which the quantization bit number at the A/D converter 8 and the signal processing bit number at the DSP 9 are set to be 8 bits, to the A/D converter 8 and the DSP 9. With this, the quantization bit number at the A/D converter 8 and the signal processing bit number at the DSP 9 are set to be 8 bits.

The CPU 14 controls the TG 13 and the diaphragm/shutter controller 7 at the same time of outputting the bit number converting signal 17. With this, the TG 13 outputs a clock signal in a designated cycle, and the diaphragm/shutter controller 7 controls the diaphragm 2 and the shutter 3.

By controlling the diaphragm 2 and the shutter 3 at the diaphragm/shutter controller 7, the distance and the amount of light of the optical image of the subject to be taken obtained at the lens 1 are adjusted to required values and the adjusted optical image is projected on the solid state image taking device 4.

At the solid state image taking device 4, the optical image of the subject to be taken is projected on the surface of the photoelectric conversion elements provided in the solid state image taking device 4. And this optical image of the subject to be taken is converted to video signals being analog electric signals by the photoelectric conversion elements.

At this time, at the H/N driver 6, driving pulses are generated by synchronizing with the clock signal outputted from the TG 13 in a designated cycle. And the generated driving pulses are outputted to the H/N registers provided in the solid state image taking device 4.

With this, at the solid state image taking device 4, the H/N registers provided in the solid state image taking device 4 output the video signals synchronized with the driving pulses outputted from the H/V drivers 6.

Next, at the analog signal processor 5, noise included in the video signals outputted from the solid state image taking device 4 is removed synchronized with the clock signal outputted from the TG 13, and the video signals from which the noise was removed are outputted to the A/D converter 8. At the A/D converter 8, the quantization bit number has been set to be 8 bits by the bit number converting signal 17 outputted from the CPU 14. With this, the video signals outputted from the analog signal processor 5 are converted to the video signals of 8 bits by synchronizing with the clock signal outputted from the TG 13 in a designated cycle, and the converted 8 bits video signals are outputted to the DSP 9.

At the DSP 9, first, at the color separation circuit 201, the color interpolation process (color process) is applied to the digital video signals outputted from the A/D converter 8. With this, the video signals outputted from the A/D converter 8 are converted to color video signals.

After this, the linear matrix process is applied to the color video signals, which were applied the color interpolation process at the color separation circuit 201, at the color correction circuit 202. And the gain of the color video signals is adjusted at the white balance circuit 203. And, the contour of the image of the color video signals is compensated at the contour compensation circuit 204, and after this the non-linear process is applied to the color video signals outputted from the contour compensation circuit 204 at the gamma correction circuit 205.

At the clip circuit 206, the color video signals that did not reach a designated gradation level are removed from the color video signals applied to the non-linear process at the gamma correction circuit 205.

At the DSP 9, the signal processing bit number has been set to be 8 bits, the same as the quantization bit number at the A/D converter 8, by the bit number converting signal 17 outputted from the CPU 14. With this, various image processes mentioned above are applied to the video signals outputted from the A/D converter 8 at 8 bits, and the color video signals generated by the various image processes are outputted from the DSP 9.

The color video signals outputted from the DSP 9 are inputted to the LCD driver 11, the I/F circuit 12, the frame memory 10, and the CPU 14 through the internal bus 18.

After this, at the LCD driver 11, processes including a part of the color video signals thinning out process so that this color video signals are displayed on the LCD 15 are applied to this color video signals outputted from the DSP 9. With this, the color video signals being the monitoring image are displayed on the LCD 15.

At this time, when the photographer pushes the shutter 3 by specified a subject to be taken, a recording mode, which records an optical image of the subject to be taken projected on the solid state image taking device 4 at the time when the shutter 3 was pushed in the recording medium 16, is executed, at the functions provided in the image taking apparatus.

At the recording mode, first, the CPU 14 outputs a bit number converting signal 17, which changes the quantization bit number at the A/D converter 8 and the signal processing bit number at the DSP 9 to 10 bits, to the A/D converter 8 and the DSP 9. With this, the quantization bit number at the A/D converter 8 and the signal processing bit number at the DSP 9 are changed to 10 bits respectively.

Next, at the solid state image taking device 4, the optical image of the subject to be taken projected on the surface of the photoelectric conversion elements at the time when the shutter 3 was pushed is converted to video signals, which are analog electric signals, by the photoelectric conversion elements and the converted video signals are then outputted.

Next, at the analog signal processor 5, noise including in the video signals outputted from the solid state image taking device 4 is removed by synchronized with the clock signal outputted from the TG 13, and the video signals with noise removed are outputted to the A/D converter 8. At the A/D converter 8, the quantization bit number has been set to be 10 bits by the bit number converting signal 17 outputted from the CPU 14. With this, the video signals outputted from the analog signal processor 5 are converted to video signals of 10 bits by synchronizing with the clock signal outputted from the TG 13, and the converted video signals are outputted to the DSP 9.

At the DSP 9, the signal processing bit number has been set to be 10 bits, which is the same as the quantization bit number at the A/D converter 8, by the bit number converting signal 17 outputted from the CPU 14. With this, image processing of 10 bits is applied to the video signals outputted from the A/D converter 8, and color video signals are generated and outputted.

The color video signals outputted from the DSP 9 are inputted to the LCD driver 11, the I/F circuit 12, the frame memory 10, and the CPU 14 through the internal bus 18.

At the I/F circuit 12, a process to record these color video signals in the recording medium 16 is applied to the color video signals outputted from the DSP 9, and the color video signals are recorded in the recording medium 16.

In the first embodiment of the present invention, at the recording mode that the color video signals are recorded in the recording medium 16, it is possible that the color video signals that are being recorded in the recording medium 16 are displayed on the LCD 15. If the color video signals that are being recorded in the recording medium 16 are displayed on the LCD 15, the color video signals displaying on the LCD 15 become the color video signals processed at 10 bits at the A/D converter 8 and the DSP 9.

Also in the first embodiment of the present invention, at the recording mode, it is possible that the photographer selects whether the color video signals that are being recorded in the recording medium 16 are displayed on the LCD 15 or not by using the mode setting switch 19.

When recording the color video signals in the recording medium 16 is completed, in order to take another image, the CPU 14 outputs a bit number converting signal 17, which changes the quantization bit number at the A/D converter 8 and the signal processing bit number at the DSP 9 to 8 bits again, to the A/D converter 8 and the DSP 9. With this, the quantization bit number at the A/D converter 8 and the signal processing bit number at the DSP 9 are changed to 8 bits respectively. This signifies that the mode returns the LCD displaying mode.

Next, the operation sequence at the PC displaying mode shown in FIG. 7B is explained. In this, the operation is explained below. After power is turned on, a taking image mode is selected at the mode setting switch 19 and a monitoring image is displayed on the LCD 15. The PC displaying mode is also selected at the mode setting switch 19 when the monitoring image is displayed on the LCD 15. In case that the PC displaying mode is directly selected at the mode setting switch 19 without selecting the taking image mode, the equivalent operation is executed.

When the PC displaying mode is selected when the monitoring image is displayed on the LCD 15, at the functions of the image taking apparatus of the present invention, image data of color video signals are transferred to a personal computer (PC) (not shown) through the I/F circuit 12.

The CPU 14 controls the LCD driver 11 through the internal bus 18 so that the LCD becomes off, with this, the LCD 15 is turned off.

In this, in case that the monitoring image is displaying on the LCD 15, the quantization bit number at the A/D converter 8 and the signal processing bit number at the DSP 9 are 8 bits respectively.

Therefore, the CPU 14 outputs the bit number converting signal 17, which changes the quantization bit number at the A/D converter 8 and the signal processing bit number at the DSP 9 to 10 bits, to the A/D converter 8 and the DSP 9, at the same time of controlling the LCD driver 11. With this, the quantization bit number at the A/D converter 8 and the signal processing bit number at the DSP 9 are changed to 10 bits respectively.

After this, in the functions in the image taking apparatus of the present invention, at the PC displaying mode, the same operation as the recording mode at the taking image mode shown in FIG. 7A, is executed until the color video signals are outputted from the DSP 9.

In this, the color video signals outputted from the DSP 9 are color video signals processed at that the quantization bit number at the A/D converter 8 and the signal processing bit number at the DSP 9 are 10 bits respectively.

At the I/F circuit 12, the color video signals outputted from the DSP 9 are converted to a format being able to be processed at the PC and the converted color video signals are transferred to the PC.

Therefore, at the PC displaying mode, the I/F circuit 12 works as an external bus interface to the PC or a printer.

Next, the operation sequence at the reproducing mode shown in FIG. 7C is explained. When the reproducing mode is selected at the mode setting switch 19, at the functions of the image taking apparatus of the present invention, operation is executed at the state that the quantization bit number at the A/D converter 8 and the signal processing bit number at the DSP 9 are 10 bits respectively, as the same as at the recording mode shown in FIG. 7A, and the PC displaying mode shown in FIG. 7B. A process to display the color video signals, stored in, e.g., the recording medium 16, the frame memory 10, or a hard disk (not shown) in the PC, on the LCD 15 by reproduction is executed. In this, a case in which the color video signals stored in the recording medium 16 are reproduced and displayed on the LCD 15 is explained. When the color video signals stored in the frame memory 10 or the hard disk of the PC are reproduced and displayed on the LCD 15, the equivalent operation is also executed.

The internal bus 18 is controlled by the CPU 14, and the color video signals stored in the recording medium 16 are read out through the I/F circuit 12, and the read out color video signals are transferred to the LCD driver 11.

At the LCD driver 11, processes including a thinning out process, in which a part of the color video signals is thinned out to display the color video signals on the LCD 15, is applied to the color video signals transferred from the recording medium 16. With this process, the color video signals stored in the recording medium 16 are reproduced and displayed on the LCD 15.

As mentioned above, at the reproducing mode, the color video signals are reproduced and displayed on the LCD 15, in a state where the solid state image taking device 4, the analog signal processor 5, the A/D converter 8, and the DSP 9 do not work.

In the reproducing mode, the first embodiment of the present invention has a structure that the operation at the solid state image taking device 4, the analog signal processor 5, the A/D converter 8, and the DSP 9 is stopped by the CPU 14. Therefore, the power consumption of the functions not related to the operation of the reproducing mode can be reduced.

Further, in the reproducing mode of the first embodiment of the present invention, the changing operation, in which the quantization bit number at the A/D converter 8 and the signal processing bit number at the DSP 9 are changed, is not needed. Therefore, the bit number converting signal 17 is not outputted from the CPU 14.

In the first embodiment of the present invention, as an example of the operation sequences, the operation sequences shown in FIGS. 7A, 7B, and 7C are explained, however, the other operation sequences can be used within the scope and spirit of the present invention.

As mentioned in the first embodiment of the present invention, the quantization bit number at the A/D converter 8 is variable. Therefore, at the LCD displaying mode, the power consumption at the A/D converter 8 can be reduced by that the quantization bit number at the A/D converter 8 is controlled to reduce.

Further, the signal processing bit number at the DSP 9 is variable. Therefore, in the LCD displaying mode, the power consumption at the DSP 9 can be reduced because the signal processing bit number at the DSP 9 is reduced to the equivalent number of the quantization bit number at the A/D converter 8. Moreover, at the back stage of the A/D converter 8, plural DSPs are not needed to provide corresponding to the changing quantization bit number at the A/D converter 8. Therefore, the circuit size of the total system of the image taking apparatus is not made large.

As mentioned above, at the LCD displaying mode, the power consumption at the A/D converter 8 and the DSP 9 is reduced. Also, the circuit size of the total system of the image taking apparatus is not made large. Therefore, the power consumption of the total system of the image taking apparatus is largely reduced.

In the LCD displaying mode, when the amount of data of the video signals outputted from the solid state image taking device 4 is reduced, after the color interpolation process is applied to all the video signals outputted from the solid state image taking device 4 at the DSP 9, a thinning out process, where a part of all the video signals is thinned out, is applied at the LCD driver 11. With this process, the generation of color alias signals is restrained, and the deterioration of the image quality of the image displaying on the LCD 15 can be prevented.

Figure 8:
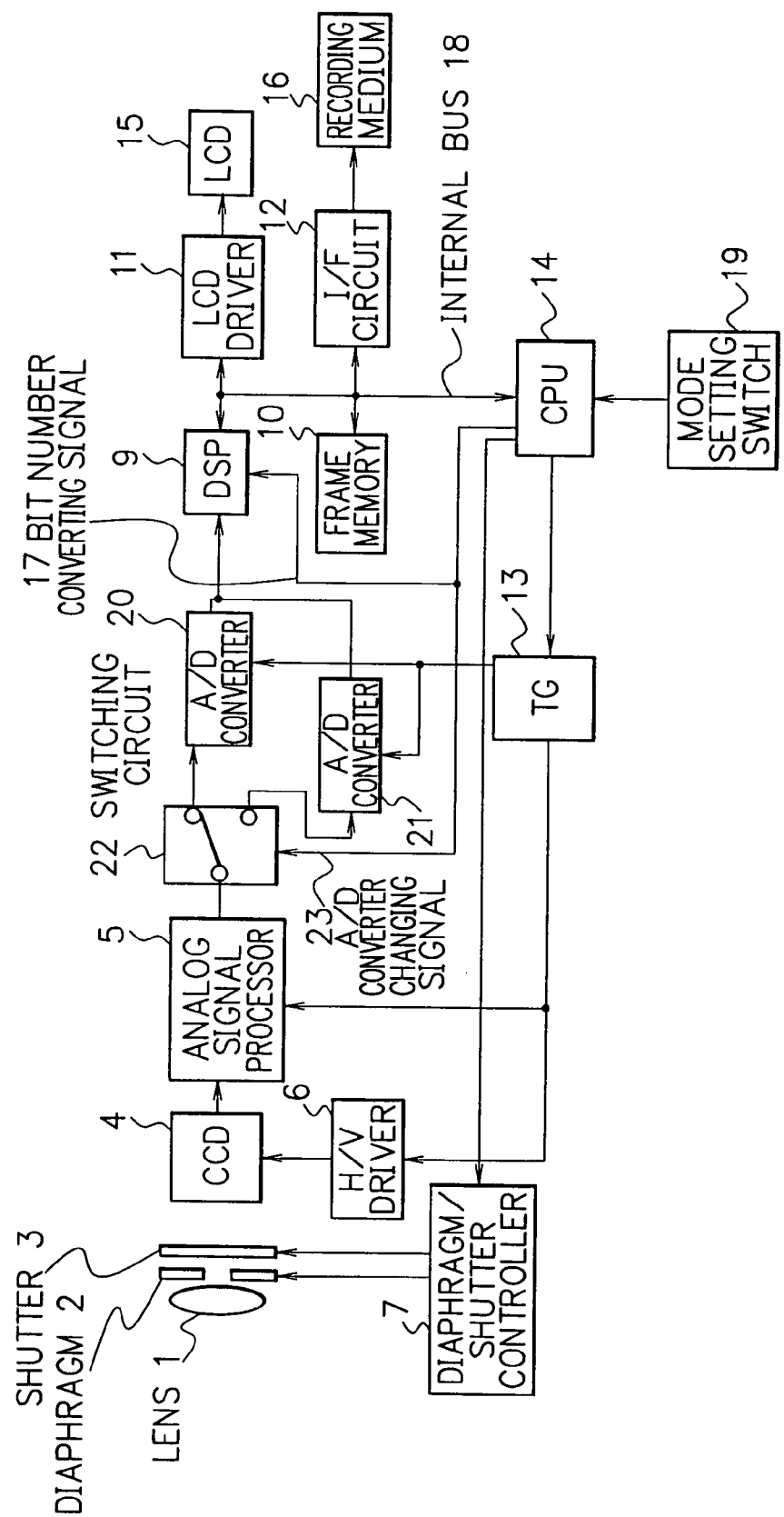
FIG. 8 is a block diagram showing a structure of a second embodiment of the image taking apparatus of the present invention.

Next, referring to a drawing, a second embodiment of the image taking apparatus of the present invention is explained. FIG. 8 is a block diagram showing a structure of the second embodiment of the image taking apparatus of the present invention.

In the second embodiment, equivalent functions in the first embodiment have the same reference number in the second embodiment. As shown in FIG. 8, in the second embodiment of the image taking apparatus of the present invention, A/D converters 20, and 21 are provided instead of the A/D converter 8 in the first embodiment, and a switching circuit 22 is added. Each of the A/D converters 20 and 21 provides a fixed quantization bit number being different between them respectively. The switching circuit 22 selects one of the A/D converters 20 and 21.

In the second embodiment of the present invention, the quantization bit number at the A/D converter 20 is set to be 10 bits, and the quantization bit number at the A/D converter 21 is set to be 8 bits.

The CPU 14 outputs an A/D converter changing signal 23 to the switching circuit 22 for making the switching circuit 22 switch, and controls the switching circuit 22 by this A/D converter changing signal 23.

The second embodiment of the present invention has a structure that the A/D converter changing signal 23 outputted from the CPU 14 is directly inputted to the switching circuit 22. However, the A/D converter changing signal 23 outputted from the CPU 14 can be inputted to the switching circuit 22 through the internal bus 18.

Operation of the second embodiment of the image taking apparatus of the present invention is explained.

At the LCD displaying mode, the CPU 14 outputs the A/D converter changing signal 23 for connecting the analog signal processor 5 and the A/D converter 21 to the switching circuit 22, and also outputs the bit number converting signal 17 for changing the signal processing bit number at the DSP 9 to 8 bits being equivalent to the quantization bit number at the A/D converter 21.

With this operation, the switching circuit 22 is changed over, and the analog signal processor 5 and the A/D converter 21 are connected. The signal processing bit number at the DSP 9 is set to 8 bits being equivalent to the quantization bit number at the A/D converter 21.

After this, at the A/D converter 21, the video signals outputted from the analog signal processor 5 are converted to the video signals being 8 bits and the 8 bit video signals are outputted. And at the DSP 9, an image process is applied to the video signals outputted from the A/D converter 21 at 8 bits.

At the recording mode and the PC displaying mode, the CPU 14 outputs the A/D converter changing signal 23 for connecting the analog signal processor 5 and the A/D converter 20 to the switching circuit 22, and also outputs the bit number converting signal 17 for changing the signal processing bit number at the DSP 9 to 10 bits being equivalent to the quantization bit number at the A/D converter 20.

With this operation, the switching circuit 22 is changed over, and the analog signal processor 5 and the A/D converter 20 are connected, and the signal processing bit number at the DSP 9 is set to 10 bits being equivalent to the quantization bit number at the A/D converter 20.

After this, at the A/D converter 20, the video signals outputted from the analog signal processor 5 are converted to the video signals being 10 bits and the 10 bit video signals are outputted. At the DSP 9, an image process is applied to the video signals outputted from the A/D converter 20 at 10 bits.

As mentioned above, at the second embodiment of the present invention, the structure, in which the video signals outputted from the analog signal processor 5 are converted to digital video signals, is only different from the first embodiment. And the other functions and operation are the same that the first embodiment has, therefore, the detailed explanation is omitted. And at the second embodiment, operation at the reproducing mode is the same as the first embodiment.

At the first and second embodiments of the present invention, the structure and operation are explained as that the image taking apparatus is the electronic still camera.

However, the image taking apparatus of the present invention can be also applied to the other apparatuses not be the electronic still camera.

Also in the first and second embodiments of the present invention, the structure and operation of the displaying apparatus for displaying images is explained as that the displaying apparatus is an LCD. However, the other displaying apparatuses not be the LCD can be also used as the displaying apparatus at the present invention.

Also in the first and second embodiments of the present invention, the cases in which the quantization bit number at the LCD displaying mode is set to be 8 bits and the quantization bit number at the recording mode and the PC displaying mode is set to be 10 bits are explained. However, in the present invention, the quantization bit number at the LCD displaying mode can be set to be an arbitrary number at the condition that the quantization bit number at the LCD displaying mode is smaller than that at the recording mode and the PC displaying mode.

In the first and second embodiments of the present invention, a structure, in which an analog process such as removing noise at an analog signal processor is applied to video signals outputted from a solid state image taking device and after this analog to digital conversion is applied to the video signals at an A/D converter, is explained. However, at the present invention, a structure, in which first the analog to digital conversion is applied to the video signals outputted from the solid state image taking device at an A/D converter and after this the digital process such as removing noise at an DSP is applied to the video signals, can be used.

As mentioned above, according to the present invention, the quantization bit number at an A/D converter is variable. Therefore, in case that a monitoring image is displayed on a displaying apparatus being at a displaying mode, when the quantization bit number at the A/D converter is controlled to be smaller than that at a recording mode or a PC displaying mode, the power consumption at the A/D converter can be reduced.

And in case that the signal processing bit number at a DSP is variable, when a monitoring image is displayed on a displaying apparatus, by setting the signal processing bit 10 number at the DSP to equal to the quantization bit number at the A/D converter, the power consumption at the DSP can be reduced. And at the back stage of the A/D converter, plural DSPs corresponding to the quantization bit number that changes at the A/D converter are not needed to provide. With this, the circuit size of the total system of the image taking apparatus can be prevented to become large.

As mentioned above, in case that the monitoring image is displayed on the displaying apparatus, the power consumption at the A/D converter and the DSP can be reduced, and also the circuit size of the total system of the image taking apparatus can be prevented from becoming large. Therefore, the power consumption of the total system of the image taking apparatus can be reduced largely.

And in case that the monitoring image is displayed on the displaying apparatus, after that image processes are applied to the video signals outputted from the solid state image taking device at the DSP, a thinning out image process, in which a part of the video signals is thinned out at a driver for the displaying apparatus, is applied to the video signals. Therefore, the generation of color alias signals can be restrained and the deterioration of the image quality can be restrained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image taking apparatus, comprising:
   a solid state image taking device which converts an optical image of a subject to be taken to analog video signals and outputs said analog video signals;
   a system controller that generates a bit number converting signal;
   an analog to digital (A/D) converter which receives said bit number converting signal and generates a designated quantization bit number, said designated quantization bit number converts said analog video signals outputted from said solid state image taking device to digital video signals having said designated quantization bit number;
   a digital signal processor (DSP) which receives said bit number converting signal and generates a designated signal processing bit number that is used in an image process applied to said digital video signals outputted from said A/D converter;
   a displaying apparatus which displays said digital video signals outputted from said DSP; and
   a recording medium which stores said digital video signals outputted from said DSP;
   wherein said designated quantization bit number and said designated signal processing bit number at said A/D converter are variable.

2. An image taking apparatus in accordance with claim 1, wherein said A/D converter makes said quantization bit number when said digital video signals are displayed on said displaying apparatus smaller than the quantization bit number when said digital video signals are stored in said recording medium.

3. An image taking apparatus in accordance with claim 1, further comprising:
   an interface (I/F) circuit which transfers said digital video signals outputted from said DSP to said recording medium in which said digital video signals are recorded, or transfers said digital video signals outputted from said DSP to an external apparatus,
   wherein said A/D converter makes said quantization bit number wherein said digital video signals are displayed on said displaying apparatus smaller than the quantization bit number when said digital video signals are transferred to said external apparatus through said I/F circuit.

4. An image taking apparatus in accordance with claim 1, wherein said signal processing bit number at said DSP is variable, and said signal processing bit number is made to be the sane bit number of said quantization bit number at said A/D converter, when said digital video signals are displayed on said displaying apparatus.

5. An image taking apparatus in accordance with claim 1, further comprising:
   a mode setting switch for setting an operation mode at said image taking apparatus,
   wherein said system controller generates said bit number converting signal for setting said quantization bit number at said A/D converter and said signal processing bit number at said DSP based on said operation mode set at said mode setting switch, and outputs said bit number converting signal to said A/D converter and said DSP, and wherein said A/D converter sets said quantization bit number based on said bit number converting signal outputted from said system controller.

6. An image taking apparatus in accordance with claim 5, wherein said system controller, in case that said digital video signals stored in said recording medium are displayed on said displaying apparatus, stops operation of said solid state image taking device, said A/D converter, and said DSP.

7. An image taking apparatus in accordance with claim 5, wherein said mode setting switch, in case that said digital video signals have been stored in said recording medium, selects whether said digital video signals stored in said recording medium are made to display on said displaying apparatus or not.

8. An image taking apparatus in accordance with claim 1, further comprising a displaying apparatus driver for making said digital video signals display on said displaying apparatus by thinning out a part of said digital video signals outputted from said DSP.

9. An image taking apparatus in accordance with claim 1, wherein said image taking apparatus is an electronic still camera.

10. An image taking apparatus, comprising:
a solid state image taking device which converts an optical image of a subject to be taken to analog video signals and outputs said analog video signals;
system controller that generates a bit number converting signal;
an analog to digital (A/D) converter which receives said bit number converting signal and generates a designated quantization bit number, said designated quantization bit number converts said analog video signals outputted from said solid state image taking device to digital video signals having said designated quantization bit number;
a digital signal processor (DSP) which receives said bit number converting signal and generates a designated signal processing bit number that is used in an image process applied to said digital video signals outputted from said A/D converter;
a displaying apparatus which displays said digital video signals outputted from said DSP; and
a recording medium which stores said digital video signals outputted from said DSP,
wherein said A/D converter provides plural A/D converting sections in which the quantization bit number of each of said plural A/D converting sections is different between them and is fixed, and either one of said plural A/D converting sections converts said analog video signals outputted from said solid state image taking device to digital video signals, and outputs said digital video signals to said DSP, and
wherein said signal processing bit number is variable.

11. An image taking apparatus in accordance with claim 10, further comprising:
a switching circuit which selects one of said plural A/D converting sections that has smaller quantization bit number than the other of said plural A/D converting sections which is selected at the time when said digital video signals are stored in said recording medium, in case that said digital video signals are displayed on said displaying apparatus,
wherein said digital video signals outputted from said A/D converting section selected by said switching circuit are inputted to said DSP.

12. An image taking apparatus in accordance with claim 10, further comprising:
an interface (I/F) circuit which transfers said digital video signals outputted from said DSP to said recording medium in which said digital video signals are recorded, or transfers said digital video signals outputted from said DSP to an external apparatus,
wherein said switching circuit, in case that said digital video signals are displayed on said displaying apparatus, selects one of said plural A/D converting sections whose quantization bit number is smaller than the other A/D converting section that is selected at the time when said digital video signals are transferred to an external apparatus through said I/F circuit.

13. An image taking apparatus in accordance with claim 10, wherein:
said signal processing bit number when said digital video signals are displayed on said displaying apparatus is made to be the same bit number of said quantization bit number at said A/D converting section selected by said switching circuit.

14. An image talking apparatus in accordance with claim 10, further comprising:
a mode setting switch for setting an operation mode at said image taking apparatus,
wherein said system controller which generates an A/D converting section changing signal for switching said switching circuit based on said operation mode set by said mode setting switch and outputs said generated A/D converting section changing signal to said switching circuit, and also generates said bit number converting signal for setting said signal processing bit number at said DSP based on said operation mode set at said mode setting switch, and outputs said bit number converting signal to said DSP, and
wherein said switching circuit selects either one of said plural A/ID converting sections based on said AD converting section changing signal outputted from said system controller.

15. An image taking apparatus in accordance with claim 14, wherein said system controller, when said digital video signals stored in said recording medium are displayed on said displaying apparatus, stops operation of said solid state image taking device, said A/D converter, and said DSP.

16. An image taking apparatus in accordance with claim 14, wherein said mode setting switch, when said digital video signals have been stored in said recording medium, selects whether said digital video signals stored in said recording medium are made to display on said displaying apparatus or not.

17. An image taking apparatus in accordance with claim 10, further comprising a displaying apparatus driver for making said digital video signals display on said displaying apparatus by thinning out a part of said digital video signals outputted from said DSP.

18. An image taking apparatus in accordance with claim 10, wherein said image taking apparatus is an electronic still camera.

19. An image taking apparatus, comprising:
a solid state image taking device which converts an optical image of a subject to be taken to analog video signals and outputs said analog video signals;
an analog to digital (A/D) converter which converts at the designated quantization bit number said analog video signals outputted from said solid state image taking device to digital video signals having said designated quantization bit number;

a digital signal processor (DSP) which applies an image process to said digital video signals outputted from said A/D converter at a designated signal processing bit number;

a displaying apparatus which displays said digital video signals outputted from said DSP; and a recording medium which stores said digital video signals outputted from said DSP, wherein said designated quantization bit number at said A/D converter is variable, and wherein said A/D converter makes said quantization bit number when said digital video signals are displayed on said displaying apparatus smaller than the quantization bit number when said digital video signals are stored in said recording medium.

20. An image taking apparatus, comprising:

a solid state image taking device which converts an optical image of a subject to be taken to analog video signals and outputs said analog video signals;

an analog to digital (A/D) converter which converts at the designated quantization bit number said analog video signals outputted from said solid state image taking device to digital video signals having said designated quantization bit number;

a digital signal processor (DSP) which applies an image process to said digital video signals outputted from said A/D converter at a designated signal processing bit number;

a displaying apparatus which displays said digital video signals outputted from said DSP;

a recording medium which stores said digital video signals outputted from said DSP; and an interface (I/F) circuit which transfers said digital video signals outputted from said DSP to said recording medium in which said digital video signals are recorded, or transfers said digital video signals outputted from said DSP to an external apparatus, wherein said A/D converter makes said quantization bit number when said digital video signals are displayed on said displaying apparatus smaller than the quantization bit number when said digital video signals are transferred to said external apparatus through said I/F circuit, and wherein said designated quantization bit number at said A/D converter is variable.

21. An image taking apparatus, comprising:

a solid state image taking device which converts an optical image of a subject to be taken to analog video signals and outputs said analog video signals;

an analog to digital (A/D) converter which converts at a designated quantization bit number said analog video signals outputted from said solid state image taking device to digital video signals having said designated quantization bit number;

a digital signal processor (DSP) which applies an image process to said digital video signals outputted from said A/D converter at a designated signal processing bit number;

a displaying apparatus which displays said digital video signals outputted from said DSP;

a recording medium which stores said digital video signals outputted from said DSP; and a switching circuit which selects one of said plural A/D converting sections that has smaller quantization bit number than the other of said plural A/D converting sections which is selected at the time when said digital video signals are stored in said recording medium, in case that said digital video signals are displayed on said displaying apparatus, wherein said A/D converter provides plural A/D converting sections in which the quantization bit number of each of said plural A/D converting sections is different between them and is fixed, and either one of said plural A/D converting sections converts said analog video signals outputted from said solid state image taking device to digital video signals, and outputs said digital video signals to said DSP, and wherein said digital video signals outputted from said A/D converting section selected by said switching circuit are inputted to said DSP.

22. An image taking apparatus, comprising:

a solid state image taking device which converts an optical image of a subject to be taken to analog video signals and outputs said analog video signals;

an analog to digital (A/D) converter which converts at a designated quantization bit number said analog video signals outputted from said solid state image taking device to digital video signals having said designated quantization bit number;

a digital signal processor (DSP) which applies an image process to said digital video signals outputted from said A/D converter at a designated signal processing bit number;

a displaying apparatus which displays said digital video signals outputted from said DSP;

a recording medium which stores said digital video signals outputted from said DSP; and an interface (I/F) circuit which transfers said digital video signals outputted from said DSP to said recording medium in which said digital video signals are recorded, or transfers said digital video signals outputted from said DSP to an external apparatus, wherein said A/D converter provides plural A/D converting sections in which the quantization bit number of each of said plural A/D converting sections is different between them and is fixed, and either one of said plural A/D converting sections converts said analog video signals outputted from said solid state image taking device to digital video signals, and outputs said digital video signals to said DSP, and wherein said switching circuit, in case that said digital video signals are displayed on said displaying apparatus, selects one of said plural A/D converting sections whose quantization bit number is smaller than the other A/D converting section that is selected at the time when said digital video signals are transferred to an external apparatus through said I/F circuit.

* * * * *

UNITED STATES PATENT AND TRADEMARK OFFICE
CERTIFICATE OF CORRECTION

PATENT NO.       : 6,999,115 B1                                    Page 1 of 1
APPLICATION NO.  : 09/707815
DATED            : February 14, 2006
INVENTOR(S)      : Katoh It is certified that error appears in the above-identified patent and that said Letters Patent is hereby corrected as shown below:

Claim 10, Col. 21, line 27, "system controller" should be --a system controller--.
Claim 14, Col. 22, line 37, "plural A/ID converting" should be --plural A/D converting--.

Signed and Sealed this

Seventh Day of July, 2009

JOHN DOLL
*Acting Director of the United States Patent and Trademark Office*